United States Patent [19]
Suzuki et al.

[11] Patent Number: 6,119,803
[45] Date of Patent: Sep. 19, 2000

[54] POWER STEERING APPARATUS

[75] Inventors: Mikio Suzuki, Hekinan; Katsuhisa Mori; Hiroshi Suzuki, both of Okazaki, all of Japan

[73] Assignee: Toyoda Koki Kabushiki Kaisha, Kariya, Japan

[21] Appl. No.: 08/904,429

[22] Filed: Jul. 31, 1997

[30] Foreign Application Priority Data

Jul. 31, 1996 [JP] Japan ................................. 8-201501

[51] Int. Cl.$^7$ ........................................... B62D 5/10
[52] U.S. Cl. ................ 180/429; 137/625.21; 137/625.23
[58] Field of Search ....................................... 180/417, 429, 180/441, 442; 137/625.21–625.23; 91/437, 464, 441, 375 R

[56] References Cited

U.S. PATENT DOCUMENTS

| | | |
|---|---|---|
| 4,848,402 | 7/1989 | Elser . |
| 5,372,214 | 12/1994 | Haga et al. . |
| 5,439,070 | 8/1995 | Haga et al. . |
| 5,471,838 | 12/1995 | Suzuki et al. . |
| 5,515,938 | 5/1996 | Haga et al. . |
| 5,638,912 | 6/1997 | Haga et al. . |
| 5,778,756 | 7/1998 | Haga . |
| 5,845,737 | 12/1998 | Suzuki . |

FOREIGN PATENT DOCUMENTS

| | | |
|---|---|---|
| 0 083 490 | 7/1983 | European Pat. Off. . |
| 0 612 652 | 8/1994 | European Pat. Off. . |
| 2 249 070 | 4/1992 | United Kingdom . |

*Primary Examiner*—Christopher P. Schwartz
*Assistant Examiner*—C. T. Bartz
*Attorney, Agent, or Firm*—Oblon, Spivak, McClelland, Maier & Neustadt, P.C.

[57] ABSTRACT

In a power steering apparatus having a control valve with a first control valve portion and a second control valve portion to enhance rigidity of a steering operation, an amount of an overlapping portion of an overlap variable orifice is designed larger than an amount of an unlapping portion of an untapped variable orifice in the control valve because of dispersion during manufacture. When the overlap variable orifice finishes overlapping, the unlapped variable orifice has already started unlapping. Therefore, since the overlap variable orifice and the unlapped variable orifice never become unlapping form simultaneously regardless of the dispersion, the control valve is capable of minimizing a difference of the flow between a plurality of the second control valve portion. As a result, the power steering apparatus relative to the invention prevents enlargement of noise caused by an unbalance of the flow between a plurality of the second control valve portions in the control valve.

2 Claims, 10 Drawing Sheets

POWER STEERING APPARATUS

BACKGROUND OF THE INVENTION

1. Field of the Invention

The present invention relates to a power steering apparatus suitable for use in automobiles and the like, and more particularly, it relates to the improvement of a hydraulic power steering apparatus which is designed to enhance rigidity of a steering operation, and to obtain a steady feeling of the steering operation at and around a neutral position of a steering wheel.

2. Description of the Prior Art

Power steering apparatuses having a control valve comprising open control valve portions and closed control valve portions have been proposed in order to give a driver a steady steering feeling in the vicinity of a neutral position of a steering wheel. An example of them is shown in U.S. Pat. No. 5,515,938 of Kaga et al.

Figure 1:
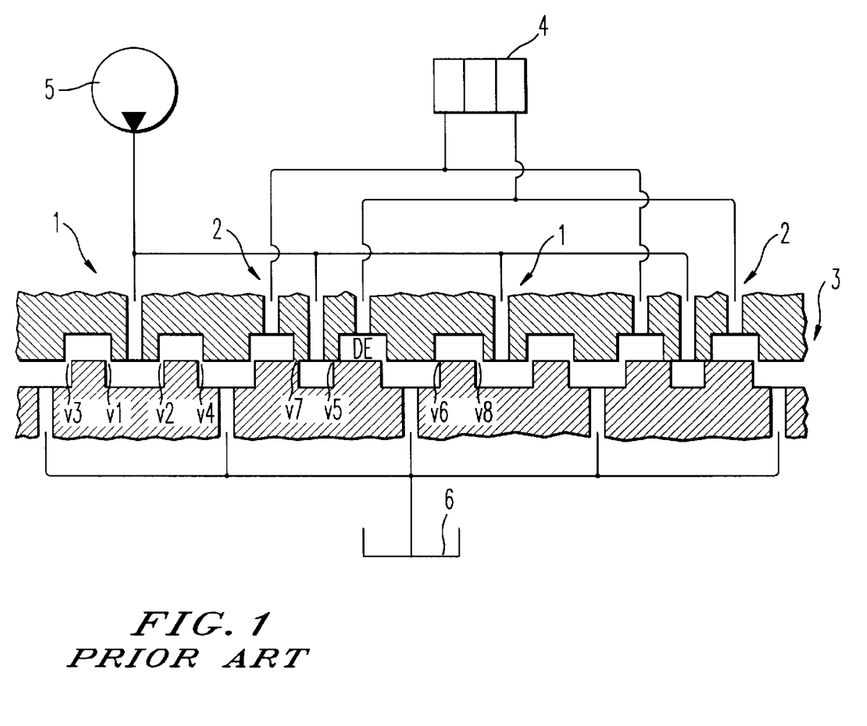
FIG. 1 is a development of a conventional control valve.

In the power steering apparatus, as shown in FIG. 1, a control valve 3 contains two kinds of control valve portions, one is an open control valve portion 1 and the other is a closed control valve portion 2. In a vicinity of a neutral position of a steering wheel, since overlap variable orifices v5, v6 in the closed control valve portion 2 are substantially closed in order to prevent supply of pressurized fluid for a power cylinder 4, the pressure in the power cylinder 4 is maintained to be extremely low or substantially zero even if a pressure of a pump 5 supplied to the control valve 3 rises in accordance with a slight rotation of the steering wheel in the vicinity of the neutral position. Therefore, the power steering apparatus is capable of giving a driver the steady steering feeling in the vicinity of the neutral position of the steering wheel.

In the power steering apparatus, two pairs of the open control valve portion 1 and the closed control valve portion 2 are arranged alternately around a cylindrical body of the control valve 3. On condition that the steering wheel is not or slightly rotated in the vicinity of the neutral position, each of the open control valve portions 1 mainly controls the pressurized fluid supplied from the pump 5. On condition that the steering wheel is rotated, both the open and the closed control valve portions control it.

In the vicinity of the neutral position, the open control valve portion 1 is designed to control the pressurized fluid through both sides of its orifice portion which form unlapped variable orifices v1, v3 (or v2, v4). However, the closed control valve portion 2 is designed to control the pressurized fluid through only one side of its orifice portion which forms an unlapped variable orifice v7 (or v8) because the other side forms the overlap variable orifice v5 (or v6). Since the closed control valve portion 2 thus decreases the route of the pressurized fluid, a configuration of the power steering apparatus with the closed control valve portion 2 works against prevention of noise caused by the pressurized fluid passing through the control valve 3, as compared with one of a power steering apparatus without the closed control valve portion 2. Therefore, there is a need for the power steering apparatus with the closed control valve portion 2 to exclude the additional influence of noise except for the configurative influence thereof.

A way to prevent the noise is the above-mentioned configuration that two pairs of the open and the closed control valve portions are arranged alternately on the control valve 3. The open control valve portions 1 diametrically face each other on a circuit of the control valve 3. The closed control valve portions 2 also face each other there. Since this configuration avoids a large flow of the pressurized fluid that concentrates in one route in the control valve 3, it is capable of preventing the concentrated pressurized fluid from enlarging the noise of the control valve 3. However, the applicant has found another negative collateral influence described hereinafter in the construction of the prior art.

Figure 2A:
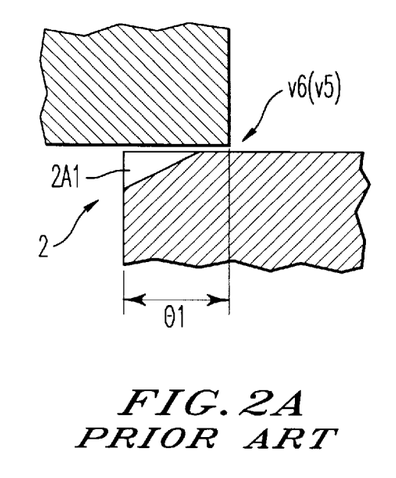
FIG. 2 is an enlarged view of a portion D of FIG. 1.
Figure 2B:
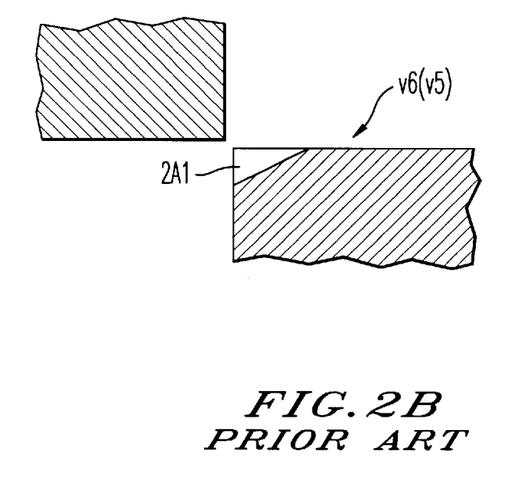
Figures 3A, 3B:
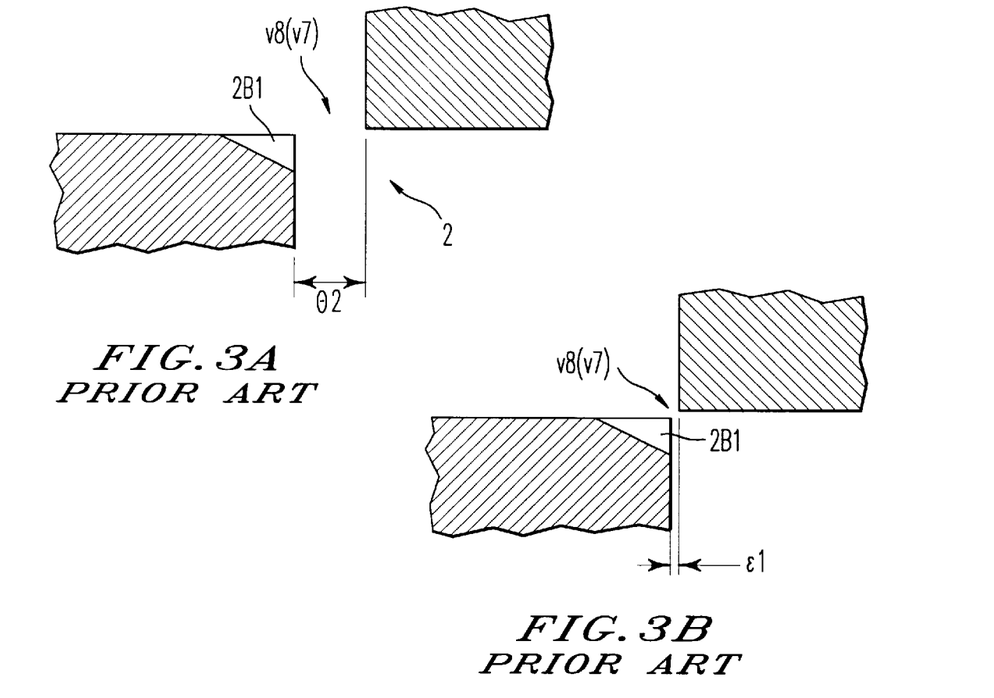
FIG. 3 is an enlarged view of a portion E of FIG. 1.

As shown in FIG. 2 and FIG. 3, the closed control valve portion 2 consists of the overlap variable orifices v5, v6 on a passage connected to the pump 5 of FIG. 1 and the unlapped variable orifices v7, v8 on passages connected to the power cylinder 4 and a reservoir 6 in FIG. 1. In the configuration, it is ideal for a characteristic of the control valve 3 at the neutral position that an amount $\theta1$ of an overlapping portion of each overlap variable orifice v6(v5) in FIG. 2(A) equals an amount $\theta2$ of an unlapping portion of each unlapped variable orifice v8(v7) in FIG. 3(A). Therefore, it is designed that the overlap variable orifice v6(v5) finishes overlapping to open itself at the same time when the unlapped variable orifice v8(v7) finishes unlapping to close itself. Chambers 2A1 and 2B1 in FIGS. 2, 3 are formed on every edge of the variable orifices v5 to v8 to lead the pressurized fluid. Here, the variable orifice with a parenthesis ( ) shows one condition that the steering wheel is rotated in an opposite direction in FIG. 2 and FIG. 3.

Figure 3C:
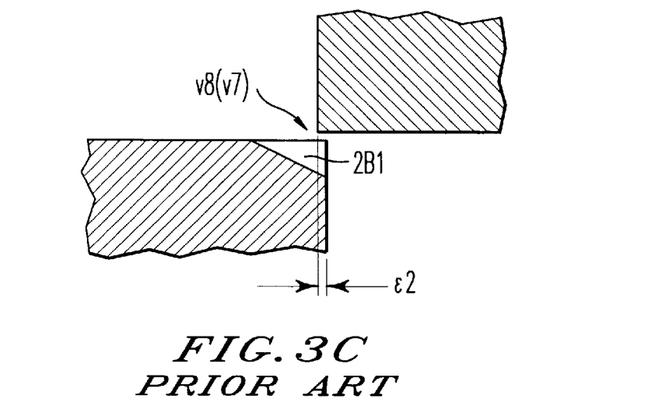

However, in practical manufacture, since it is almost impossible work to produce the variable orifices v5 to v8 with accurate width in accordance with engineering dimensions of a drawing thereof, it is unavoidable to cause dispersion of the width of the variable orifices v5 to v8. Accordingly, when the overlap variable orifice v6(v5) finishes overlapping, as shown in FIG. 2(B), the unlapped variable orifice v8(v7) does not yet finish unlapping because of dispersion $\epsilon1$, as shown in FIG. 3(B), or it already starts overlapping because of dispersion $\epsilon2$, as shown in FIG. 3(C).

Therefore, the dispersion brings about a difference between opening areas of two closed control valve portions 2 which diametrically face each other on the circuit of the control valve 3. It causes also a difference between flows of a pair of the closed control valve portions 2. As a result, there is a problem that the unbalance of the flows will enlarge the noise of the control valve 3 when the steering wheel is rotated.

BRIEF SUMMARY OF THE INVENTION

Accordingly, an object of the present invention is to provide an improved power steering apparatus capable of preventing enlargement of noise in a control valve, and capable of enhancing the rigidity of the steering operation at and around the neutral position of the steering wheel.

Briefly, a power steering apparatus has a control valve for controlling a flow of the pressurized fluid supplied from a fluid source according to the operation of a steering wheel. The control valve contains a first control valve portion and a second control valve portion. The first control valve portion controls the flow of pressurized fluid drained from the fluid source to a reservoir. Also, it has at least an unlapped variable orifice which takes an unlapping form in itself in a neutral state of the control valve. The second control valve portion controls the flow of pressurized fluid supplied from the fluid source to a power cylinder. Furthermore, it has at least an overlap variable orifice which takes an overlapping form in itself in the neutral state of the control valve. An amount of an overlapping portion of the overlap variable orifice is larger than an amount of an unlapping portion of the unlapped variable orifice in the neutral state.

In power steering apparatus having the above-mentioned construction, the flow of the pressurized fluid from/to the power cylinder is restricted by the overlap variable orifice of the second control valve portion at and around the neutral position of the steering wheel. Since a differential pressure in the power cylinder is maintained to be extremely low or substantially zero, the steering feeling becomes the same as a feeling of a nonassisted steering apparatus. Therefore, the power steering apparatus gives a driver a steady feeling in the vicinity of the neutral position of the steering wheel.

When the steering wheel is rotated beyond the amount of the overlapping portion of the overlap variable orifice, the differential pressure in the power cylinder originates because the overlap variable orifice is reversed to take the unlapping form in itself. Consequently, assistant force is adequately produced in the power steering apparatus.

In the construction described above, the amount of the overlapping portion of the overlap variable orifice is designed larger than the amount of the unlapping portion of the unlapped variable orifice in consideration of dispersion on manufacture. When the overlap variable orifice finishes overlapping, the unlapped variable orifice has already started unlapping. Therefore, since the overlap variable orifice and the unlapped variable orifice never become unlapping form simultaneously regardless of the dispersion, a difference of the flow between a plurality of the second control valve portions is minimized. As a result, the power steering apparatus according to the invention is capable of preventing enlargement of noise caused by unbalance of the flow between a plurality of the second control valve portions in the control valve.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 4:
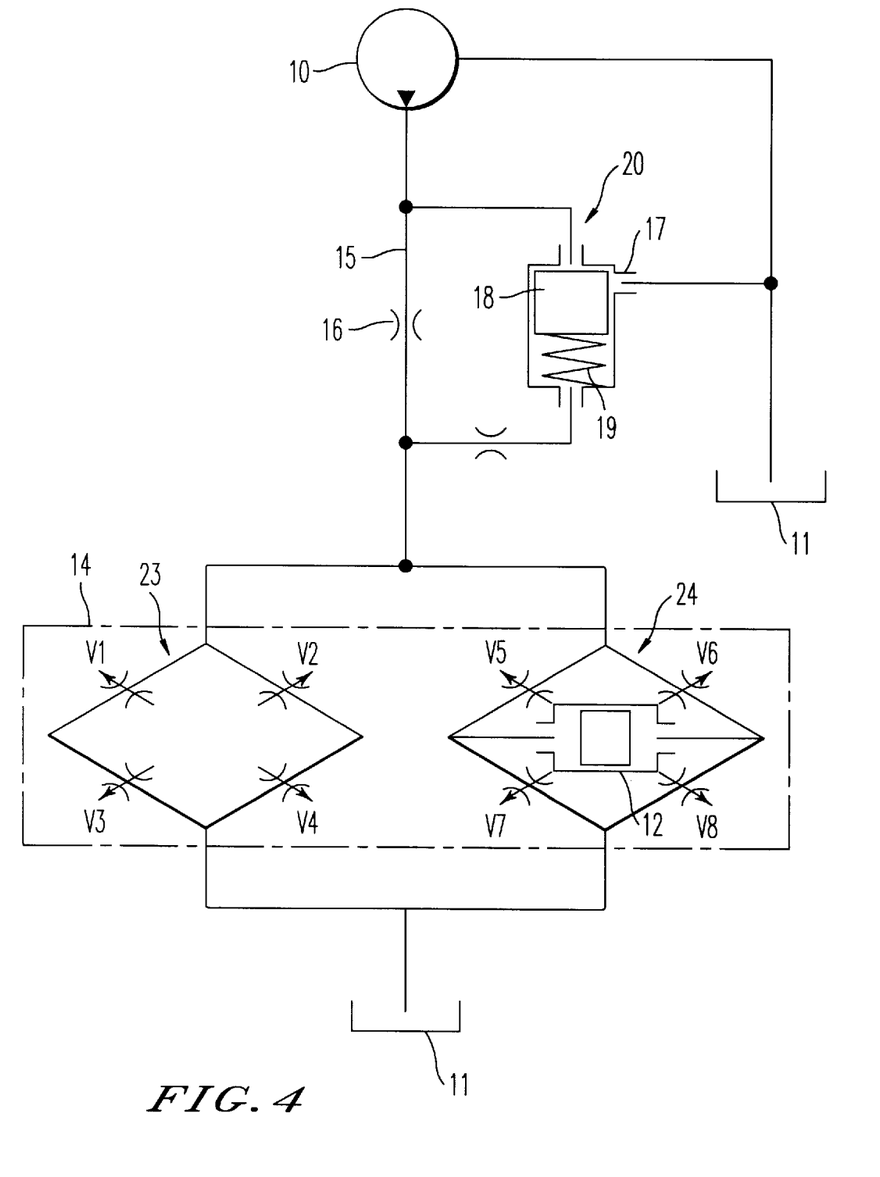
FIG. 4 is a diagram showing a power steering apparatus according to an embodiment of the present invention.

Referring now to FIG. 4, one embodiment of the present invention will be described hereinafter. The present embodiment comprises a pump assembly with a pump 10 which is a fluid source, driven by an unshown automotive engine, a reservoir 11, a power cylinder 12 for assisting steering operation and having two opposite chambers, and a rotary control valve 14 for controlling a flow of pressurized fluid supplied from the pump 10 to the power cylinder 12 according to an operation of an unshown steering wheel.

A pump assembly has the pump 10 and a known flow control valve 20. The flow control valve 20 comprises a metering orifice 16 provided in an outlet passage 15, a bypass spool 18 provided in parallel to the metering orifice 16, and a spring 19 for biasing the bypass spool 18 in order that the bypass spool 18 closes an opening of a bypass passage 17 connected to the reservoir 11. The flow control valve 20 is designed to control a flow rate of pressurized fluid because the bypass spool 18 moves to regulate an opening area of the bypass passage 17 according to a differential pressure between upper and lower streams of the metering orifice 16.

Figure 5:
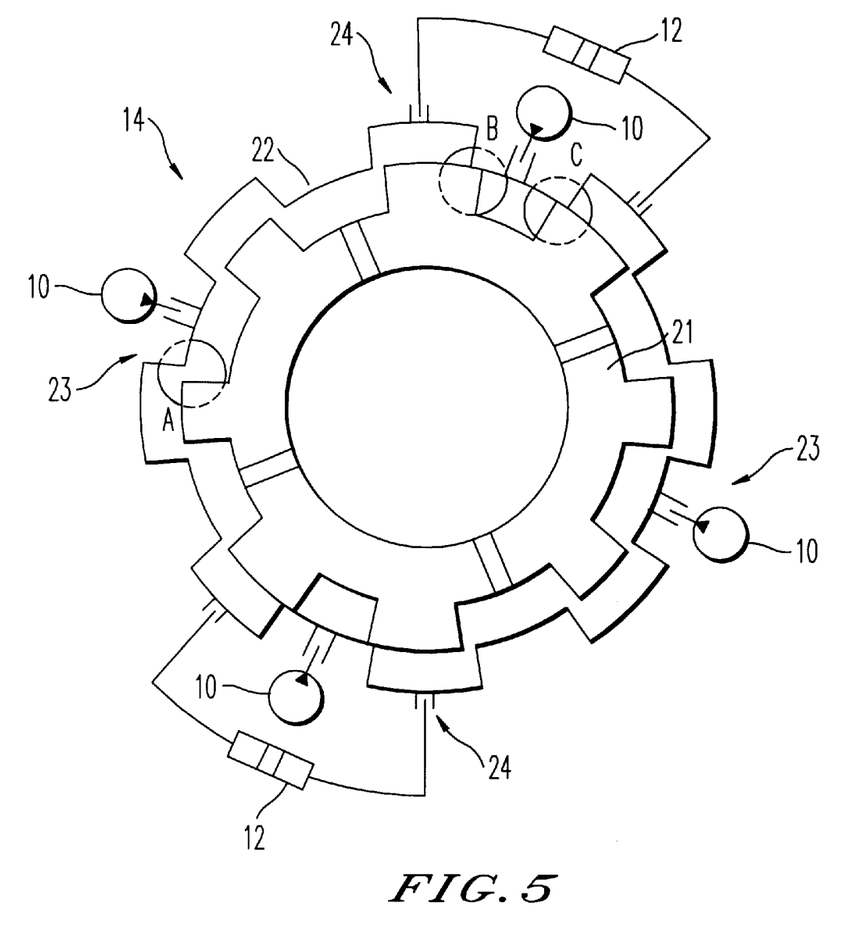
FIG. 5 is a sectional view showing the structure of a control valve shown in FIG. 4.
Figure 6:
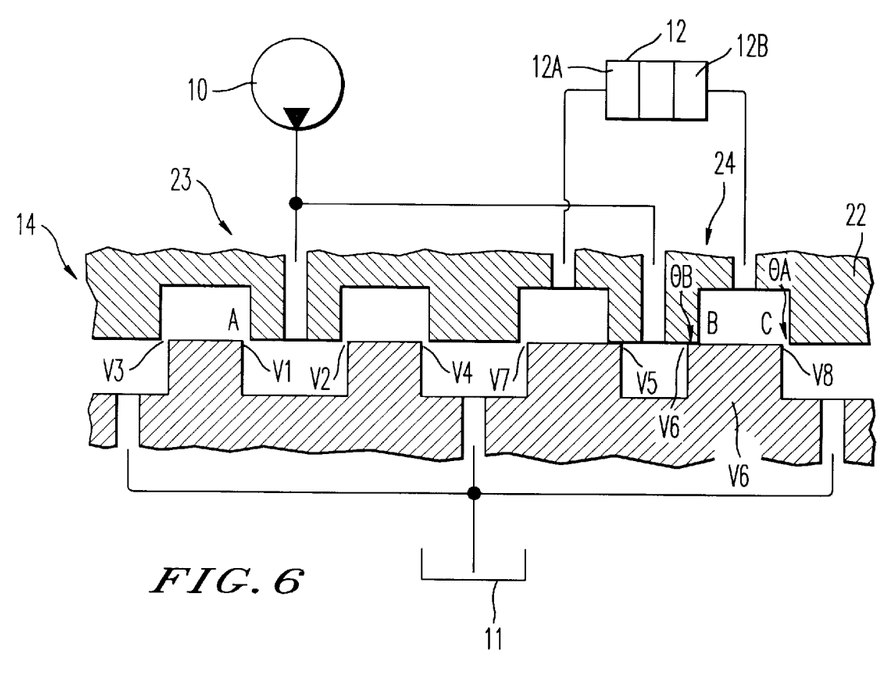
FIG. 6 is a partial development of a control valve shown in FIG. 5.

The control valve 14 is a cylindrical device. FIG. 5 is a sectional view of the control valve 14 in a diametric direction, FIG. 6 is a partial development of a half circumference of the control valve 14. The rotary control valve 14 comprises a valve shaft 21 rotated in association with the steering wheel, a valve body 22 coaxially arranged around the valve shaft 21 and connected to an unshown steering linkage, an unshown torsion bar for allowing a relative rotation between the valve shaft 21 and the valve body 22 within a certain elastic range, and an unshown valve housing for housing the above-mentioned members. In an outer surface of the valve shaft 21 and an inner surface of the valve body 22, orifice teeth are formed, respectively. A pair of edges of one orifice tooth in the valve shaft 21 and the valve body 22 forms variable orifices V1 to V8 described hereinafter. Two open control valve portions 23 and two closed control valve portions 24 are formed between the valve shaft 21 and the valve body 22 to control the flow of the pressurized fluid. They are alternatively arranged with 90 degrees between separations. Two open control valve portions 23 diametrically face each other. Two closed control valve portions 24 face the same.

Figures 7A, 7B:
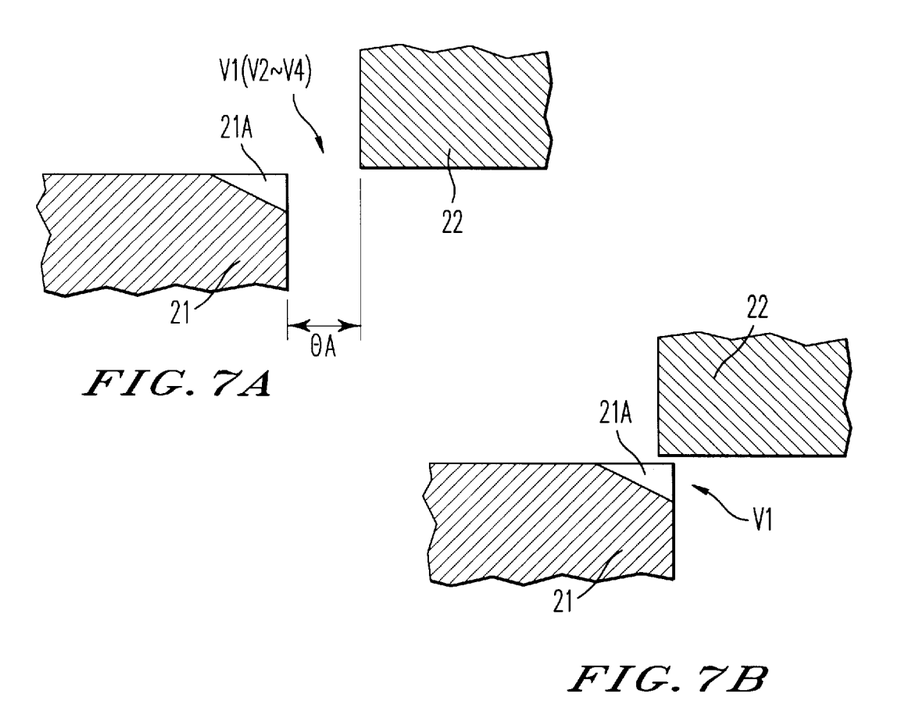
FIG. 7 is an enlarged view of a portion A of FIG. 6.

A pair of the open control valve portion 23 and the closed control valve portion 24, which parallel each other, comprise the variable orifices V1 to V8 which constitute two variable orifice bridge circuits shown in FIG. 4. The open control valve portion 23 comprises four unlapped variable orifices V1 to V4 respectively provided on four passages which communicate with either the pump 10 or the reservoir 11. As shown in FIG. 7(A), each of the unlapped variable orifices V1 to V4 takes the unlapping form in itself because each pair of the orifice tooth thereof are separated. Therefore, all opening areas of the unlapped variable orifices V1 to V4 largely open when the steering wheel is at its neutral state. One pair of the unlapped variable orifices V1, V4 and V2, V3 gradually open larger and the other pair simultaneously close in accordance with a rotational direction of the steering wheel.

Figure 8A:
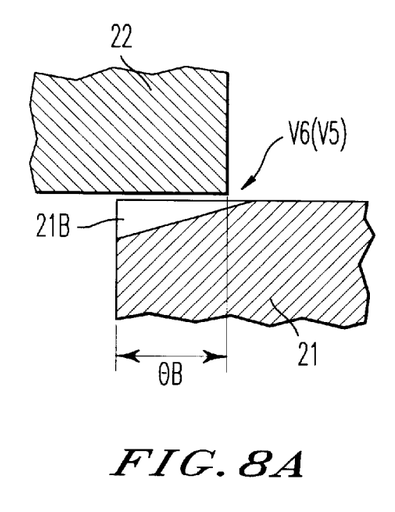
FIG. 8 is an enlarged view of a portion B of FIG. 6.

The closed control valve portion 24 in FIG. 6 comprises two overlap variable orifices V5, V6 and two unlapped variable orifices V7, V8. The overlap variable orifices V5, V6 are respectively provided on two passages which communicate with the pump 10 and either chamber 12A or 12B of the power cylinder 12. The unlapped variable orifices V7, V8 are respectively provided on two passages which communicate with the reservoir 11 and either chamber 12A or 12B of the power cylinder 12. As shown in FIG. 8(A), each of the overlap variable orifices V5, V6 takes the overlapping form in itself because each pair of the orifice tooth thereof is overlapped. Therefore, each opening area of the overlap variable orifices V5, V6 substantially closes when the steering wheel is at the neutral state. One of the overlap variable orifices V5, V6 gradually opens to become an unlapping form and the other simultaneously closes much more in accordance with the rotational direction of the steering wheel.

Figures 9A, 9B:
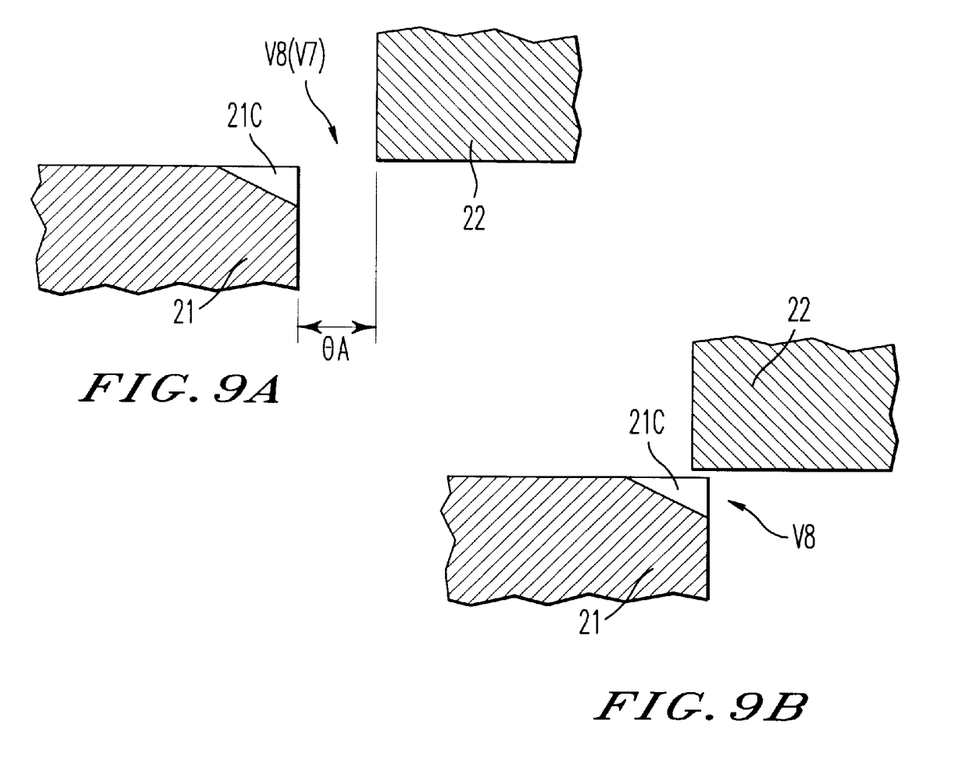
FIG. 9 is an enlarged view of a portion C of FIG. 6.

On the other hand, as shown in FIG. 9(A), each of the unlapped variable orifices V7, V8 takes the unlapping form in itself. Therefore, each opening area of the unlapped variable orifices V7, V8 largely open itself like the unlapped variable orifices V1 to V4 when the steering wheel is at the neutral state. Also, one of the unlapped variable orifices V7, V8 gradually opens larger and the other simultaneously closes in accordance with the rotational direction of the steering wheel. As a result, since the variable orifices V5, V8 and V6, V7 are respectively paired, the one pair of the variable orifices opens when the other pair closes.

As shown in FIGS. 7, 8, 9, unstepped chamfers 21A, 21B, 21C are formed on edges of the orifice tooth of the variable orifices V1 to V8 in the open and the closed control valve portions 23, 24. Consequently, on condition that the steering wheel is at its neutral state, the variable orifices V5, V6 keep a slight opening area thereof because of chamfers 21B to slightly release the pressurized fluid.

In the neutral state of the rotary control valve 14 where the steering wheel is at its neutral state, each opening area of the overlap variable orifices V5, V6 is sufficiently smaller than each opening area of the unlapped variable orifices V1 to V4, V7, V8. As the rotary control valve 14 is rotated, an amount of the opening areas of the overlap variable orifice V6 (V5) gradually comes to equal one of the unlapped variable orifices V1, V4, V8 (V2, V3, V7), and finally they reverse. Namely, the overlap variable orifice V6 (V5) comes to take the unlapping form in itself. Each of the unlapped variable orifices V1, V4, V8 (V2, V3, V7) comes to take the overlapping form in itself. Here, the variable orifice with a parenthesis ( ) shows one condition that the steering wheel is rotated in an opposite direction in FIGS. 7, 8 and 9.

In the construction described above in FIG. 8(A), on the condition that the rotary control valve 14 is at its neutral state, each amount θB of the overlapping portions of the overlap variable orifices V5, V6 is designed larger than each amount θA of the unlapping portions of the unlapped variable orifices V7, V8 in FIG. 9(A). This structure is provided so that the overlapping portion of the valve shaft 21 or the valve body 22 is formed larger than one of the prior art of the control valve. A difference θα between the amounts θB and θA, namely θB−θA, is given in accordance with dispersion of width of the variable orifices V5, V6, V7, V8 in the valve shaft 21 and the valve body 22 in practical manufacture. Therefore, when the overlap variable orifice V6 (V5) finishes overlapping in FIG. 8(A), the unlapped variable orifice V8 (V7) has already started unlapping in FIG. 9(A). The rotary control valve 14 is capable of preventing the overlap variable orifice V6 (V5) and the unlapped variable orifice V8 (V7) from becoming unlapping form simultaneously regardless of the dispersion.

In the present embodiment described above in FIG. 4, the pressurized fluid is supplied from the pump 10 to the open and the closed control valve portions 23, 24 through the metering orifice 16. At the neutral position of the steering wheel, almost all the flow of the pressurized fluid supplied from the pump 10 drains to the reservoir 11 through the variable orifices V1 to V4 in the open control valve portion 23 because the overlap variable orifice V5, V6 in the closed control valve portion 24 restricts the pressurized fluid. Consequently, since the pressurized fluid is not supplied from the pump 10 to either of the chambers 12A, 12B of the power cylinder 12 in FIG. 6, the differential pressure between the chambers 12A, 12B for assistant power of the power steering apparatus is not originated.

For example, when the valve shaft 21 moves slightly rightward on the valve body 22 in FIG. 6 by the rotation of the steering wheel, each opening area of the variable orifices V2, V3 expands in the open control valve portion 23. On the other hand, each opening area of the variable orifices V1, V4 reduces at the same time. Therefore, although the discharge pressure of the pump 10 rises slightly, the differential pressure is little changed until the valve operating angle reaches an angle θT not shown. The angle θT brings a manual torque T1 generated by relative displacement between the valve shaft 21 and the valve body 22 in accordance with the rotation of the steering wheel, as shown in FIG. 9. No differential pressure is originated by reason that the opening area of the unstepped overlap variable orifice V6 in FIG. 8 is sufficiently smaller compared with the unlapped variable orifice V8 in FIG. 9. As a result, the differential pressure is maintained at substantially zero until the valve operating angle exceeds the manual torque T1, as shown graphically in FIG. 10. On condition that the valve operating angle is less than or equal to the manual torque T1, the differential pressure is prevented from rising, as shown in FIG. 9. Thus, rigidity of the steering operation is enhanced. Namely, the steering feeling becomes the same as the feeling of a nonassisted steering apparatus in the vicinity of the neutral position of the steering wheel.

Figure 8B:
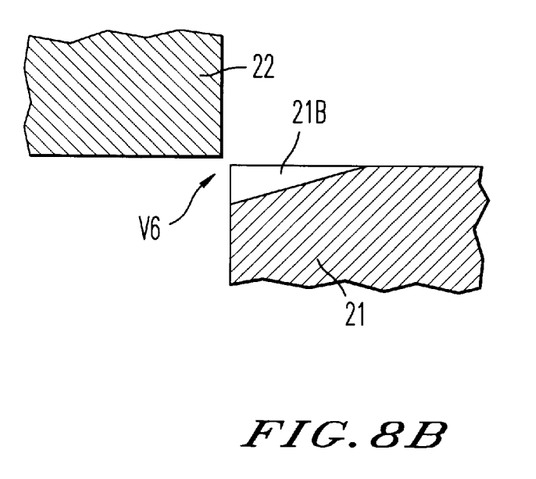
Figure 10:
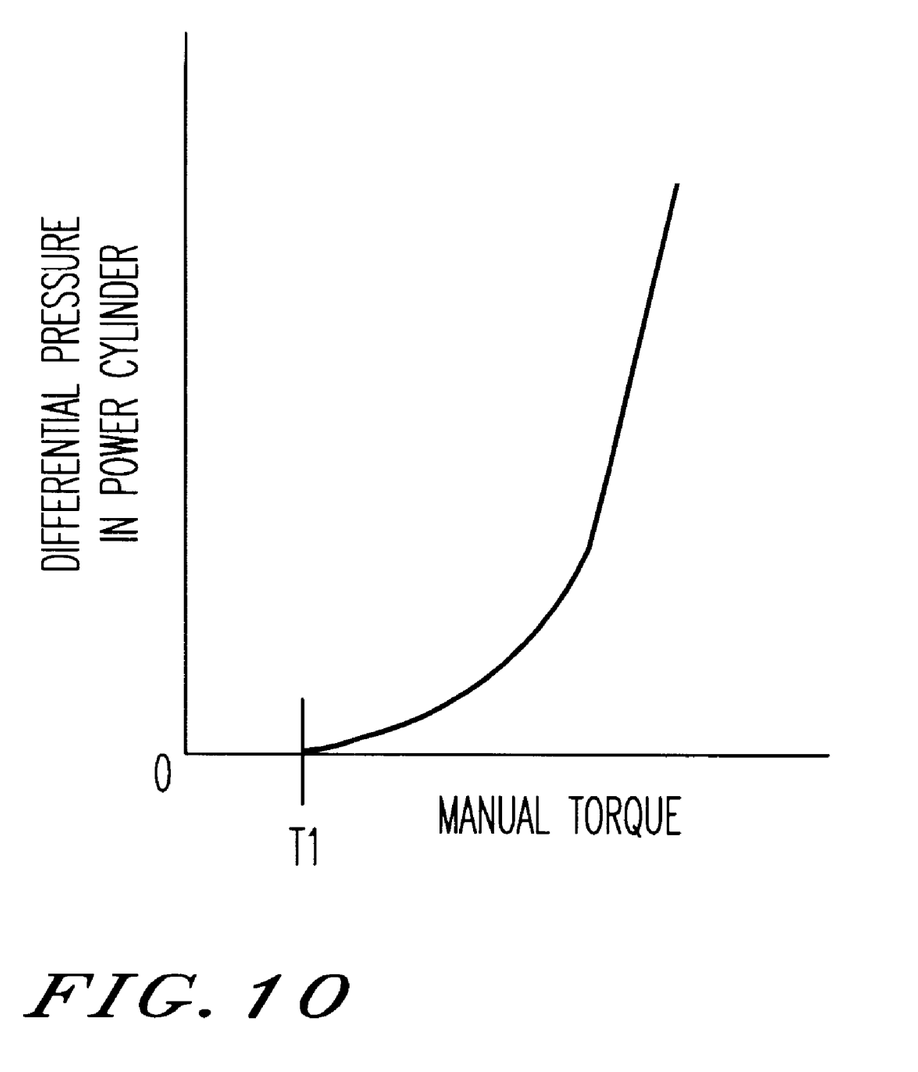
FIG. 10 is a graph showing a relationship between a manual torque and a differential pressure in a power cylinder.

When the manual torque exceeds the manual torque T1 by the rotation of the steering wheel as seen in FIG. 10, the opening area of the variable orifice V6 in FIG. 8(B) is larger than one of the variable orifice V8 in FIG. 9(B). The pressure rises in one of the chambers 12A, 12B of the power cylinder 12 in FIG. 6 and the differential pressure between the chambers 12A, 12B originates sequentially. Consequently, assistant force is adequately produced in the power steering apparatus.

In the construction of the embodiment, the amount θB of an unstepped overlapping portion of the overlap variable orifice V5 or V6 is designed larger than the amount θA of an unlapping portion of the unlapped variable orifice V7 or V8 in consideration of dispersion during manufacture. When the overlap variable orifice V6 (V5) finishes overlapping as shown in FIG. 8(B), the unlapping variable orifice V8 (V7) has already started overlapping as shown in FIG. 9(B).

Since the overlap variable orifice V6 (V5) and the unlapped variable orifice V8 (V7) never become unlapping form simultaneously regardless of the dispersion in FIG. 6, it prevents one of the closed control valve portions 24, which diametrically face each other on the circumference of the control valve 14, from discharging the pressurized fluid more than the other. Therefore, a difference of the flow between a pair of the closed control valve portion 24 is not generated. As a result, the power steering apparatus is capable of preventing enlargement of noise caused by unbalance of the flow between a pair of the closed control valve portions 24.

In the manner as stated above, the chamfers 21B in FIG. 8(B) are formed on edges of the orifice tooth of the overlap variable orifices V5, V6 to keep a slight opening area thereof at the neutral state. However, the chamfers 21B are not exactly essentials. It is appreciated that overlap variable orifices without chamfers, which completely close their opening areas at the neutral state, are employed as another embodiment.

In the aforementioned embodiment in FIG. 6, each of the variable orifices V5, V6 takes the overlapping form in itself in the closed control valve portion 24 on the side of the pump 10. As an opposite embodiment, it is appreciated that each of the variable orifices V7, V8 on the side of the reservoir 11, which takes the overlapping form in itself, is employed. In this embodiment, each of the variable orifices V5, V6 on the side of the pump 10 takes the unlapping form in itself. In this case, the same function and effect are obtained as well.

What is claimed is:

1. A power steering apparatus having a fluid source that supplies pressurized fluid, a reservoir, a power cylinder having two fluid chambers, and a control valve that controls a flow of the pressurized fluid supplied from said fluid source according to an operation of a steering wheel, said control valve comprising:

a first control valve portion that controls the flow of pressurized fluid drained from said fluid source to said reservoir, said first control valve portion having at least an unlapped variable orifice which takes an unlapping form in itself in a neutral state of said control valve; and a second control valve portion that controls the flow of pressurized fluid supplied from said fluid source to said power cylinder, said second control valve portion having at least an unstepped overlap variable orifice which takes an overlapping form in itself in the neutral state of said control valve;

wherein an amount of an overlapping portion of said overlap variable orifice is larger than an amount of an unlapping portion of said unlapped variable orifice in the neutral state of the steering wheel;

wherein said overlap variable orifice has an unstepped chamfer portion that restricts the flow of pressurized fluid supplied from said fluid source to said power cylinder in said second control valve portion in order to keep a slight opening area of the overlapping portion of the unstepped overlap variable orifice in the neutral state of said control valve; and wherein the slight opening area of the overlapping portion of the unstepped overlap variable orifice is smaller than an opening area of the unlapping portion of the unlapped variable orifice in the neutral state of the steering wheel.

2. A power steering apparatus having a fluid source that supplies pressurized fluid, a reservoir, a power cylinder having two fluid chambers, and a control valve that controls a flow of the pressurized fluid supplied from said fluid source according to an operation of a steering wheel, said control valve comprising:

a first control valve portion that controls the flow of pressurized fluid drained from said fluid source to said reservoir, said first control valve portion having at least an unlapped variable orifice which takes an unlapping form in itself in a neutral state of said control valve; and a second control valve portion that controls the flow of pressurized fluid supplied from said fluid source to said power cylinder, said second control valve portion having at least two unlapped variable orifices, and said second control valve portion also having at least two unstepped overlap variable orifices which take an overlapping form in themselves in the neutral state of said control valve and which are arranged on the side of either said reservoir or said fluid source;

wherein an amount of an overlapping portion of said overlap variable orifice is larger than an amount of an unlapping portion of said unlapped variable orifice in said second control valve portion in the neutral state of the steering wheel;

wherein said overlap variable orifice has an unstepped chamfer portion that restricts the flow of pressurized fluid supplied from said fluid source to said power cylinder in said second control valve portion in order to keep a slight opening area of the overlapping portion of the two unstepped overlap variable orifices in the neutral state of said control valve; and wherein the slight opening area of each overlapping portion of the two unstepped overlap variable orifices is smaller than an opening area of the unlapping portion of the unlapped variable orifice in the second control valve portion in the neutral state of the steering wheel.

* * * * *

UNITED STATES PATENT AND TRADEMARK OFFICE
CERTIFICATE OF CORRECTION

PATENT NO. : 6,119,803

DATED : September 19, 2000

INVENTOR(S): Mikio SUZUKI, et al.

It is certified that an error appears in the above-identified patent and that said Letters Patent is hereby corrected as shown below:

On the title page, the Continued Prosecution Application information has been omitted. It should read as follows:

-- [45]  **Date of Patent: \*Sep. 19, 2000**

[\*]   Notice:   This patent issued on a continued prosecution application filed under 37 CFR 1.53(d), and is subject to the twenty year patent term provisions of 35 U.S.C. 154(a)(2). --

Signed and Sealed this

Fifteenth Day of May, 2001

Attest:

NICHOLAS P. GODICI

Attesting Officer

Acting Director of the United States Patent and Trademark Office